Aug. 29, 1967 M. SCHLICHTE 3,339,023
COMMUNICATION TRANSMISSION SYSTEM HAVING A PLURALITY
OF DIFFERENTLY LOADED TWO-WIRE LINE SECTIONS
Filed July 24, 1962 2 Sheets-Sheet 1

3,339,023
COMMUNICATION TRANSMISSION SYSTEM HAVING A PLURALITY OF DIFFERENTLY LOADED TWO-WIRE LINE SECTIONS

Max Schlichte, Munich, Germany, assignor to Siemens & Halske Aktiengesellschaft, Berlin and Munich, Germany, a corporation of Germany Filed July 24, 1962, Ser. No. 212,047
Claims priority, application Germany, July 28, 1961, S 75,043
8 Claims. (Cl. 179—15)

The invention disclosed herein is concerned with a communication transmission system having a plurality of differently loaded two-wire line sections.

In transmission systems used in the communication art, there are generally disposed, between two end points or stations which are to be connected, in addition to the transmission line proper, which may involve a plurality of sections, repeaters, filters, amplifiers, distortion correctors and the like, which shall herein also be designated as line sections, all these line sections being connected serially or in a chain circuit. Over this chain circuit which forms the transmission line extending between two end stations, is transmitted the signal energy passing in either direction of communication.

It is in the presence of such a plurality of line sections possible that all sections cannot be loaded to the same extent, but that individual sections must be loaded less than others, that is, that a lower power level upon such individual sections respectively is permissible or desired. A line section requiring lower loading naturally also affects the loading of the remaining line sections, thus preventing in given situations a loading of these remaining line sections which would otherwise be possible and desirable for the signal transmission.

Various reasons may account for the different loading that may be placed on line sections. For example, a line section may contain a component which can be operatively triggered only to a limited extent, whereby a definite limit is set for the signal level of the entire transmission line by the member of the chain of line sections which requires the least loading. On the other hand, a transmission line which is generally subjected to relatively slight disturbances and upon which a desired relatively low signal level would be sufficient, for example, with consideration of crosstalk effect, may be disturbed to a greater extent at given points, which would make it desirable to have an appropriate high signal level on the line.

The present invention points a way, in connection with a two-wire line having one or more line sections requiring relatively low loading, of maintaining along the remaining line sections a desired higher power level which is appropriate for the operation thereof.

The invention is accordingly concerned with a two-wire transmission system having a plurality of line sections, comprising means, disposed between line sections requiring different loading, forming a four-pole for transmitting the signals delivered by the corresponding line sections respectively to other line sections, such a four-pole acting in power amplifying sense in the direction from a line section with lower loading to a line section with higher loading while acting in a power attenuating sense in the direction from a line section with higher loading to a line section with lower loading.

The invention thus makes it possible, in connection with a two-wire transmission system, to match the power level to the individual line sections, without entailing a disturbing dependence with respect to loading of other line sections.

While it is known to use, for the control of the power level along two-wire lines, damping or attenuating members and, for example, so-called NLT-amplifiers, such devices are merely adapted to respectively attenuate or to amplify in both directions of transmission. This also applies to two-wire amplifiers for separately amplifying signals in both directions, which require, in view of the temporarily necessary four-wire operation, an additional expenditure with respect to fork circuits and in given cases also gates. The known transmission systems do not provide a matching of the power level to a given loading of a line section, such as is made possible by the invention.

The invention shows, above and beyond this feature, also a way for increasing the switching phases in a time multiplex transmission system, so as to increase the number of transmission channels which are bundled as to time. It must be considered in this connection that the subscriber lines which are to be interconnected are over periodically acting connection means (call switches) synchronously connected with a time multiplex connection bar, and that there is an upper limit for the power that may be controlled over the individual switches, with the consequence that only a relatively low signal power can be transmitted since the total signal energy must always be transmitted in a scanning period during the very short closure time of the respective call switches. The call switches are thereby loaded with the power to be transmitted, which power is proportional to the signal energy of a scanning period and inversely proportional to the switching or closure time of the respective switches, and it follows, therefore, that the switches can transmit a signal power which is proportional to the maximum switching power which is permissible for the switches and inversely proportional to duration of the scanning period. The greater the number of switching phases, that is, the greater the number of transmission channels which are bundled as to time, and consequently shortened switching intervals, the smaller would have to be the signal power that can be controlled by a switch. This situation sets a limit for the often desired increase of the switching phases in a time multiplex connection network system, for increasing the number of transmission channels.

The invention overcomes these limits to a large extent in that it makes it possible to select the signal level on the subscriber lines which are to be interconnected, as high as required in given cases, while reducing the signal level in the line section containing the switch for the periodic connection of a subscriber line to the time multiplex bar, so that the permissible switching power of the corresponding switch is not exceeded, even with great bundling of transmission channels and consequently great number of switching phases, while the signal level is upon transition in reverse direction again appropriately increased in the line section extending from a call switch to the subscriber line proper.

Details of the invention will appear from the description which is rendered below with reference to the accompanying drawings.

FIG. 1*a* shows an example of an embodiment of a time multiplex transmission system comprising a plurality of two-wire line sections which are to be differently loaded;

FIG. 1*b* indicates in diagrammatic manner the action of a four-pole;

Figure 1A:
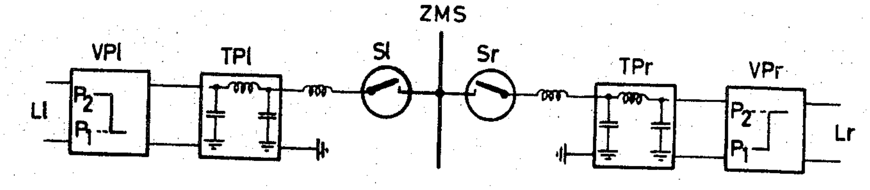

Referring now to FIG. 1*a*, L*l* and L*r* indicate two subscriber lines which are to be interconnected over the time multiplex system having a plurality of two-wire line sections which are to be differently loaded. The two subscriber lines are for this purpose periodically briefly connected (interval $\tau$) with the time multiplex connection bar ZMS, which is effected with the aid of two switches S*l* and S*r*, such switches being synchronously actuated in suitable manner which is here of no particular interest. Further pairs of subscribed lines (omitted in FIG. 1*a*) may be connected with the multiplex connection bar ZMS during a scanning period in other switching phases, thereby obtaining a bundling as to time of the transmission channels. Ahead of the respective switches S*l* and S*r* are disposed a flyback inductance and a low pass filter respectively indicated at TP*l* and TP*r*, these filters being circuited as $\pi$-members, the last capacitance of these filters, facing in the direction of the corresponding switches S*l* and S*r*, also acting as a storage capacitance. The effect of the combination of an appropriately dimensioned storage capacitance and a flyback inductance resides in that the signal energy obtained from the respective subscriber lines L*l* and L*r* during the switching interval $\tau$ in which the switches S*l* and S*r* are closed, is in each pause between two switching operations $\tau$, in which the switches S*l* and S*r* are open, stored in the corresponding storage capacitance, and that the signal energies stored in the storage capacitances are approximately without loss exchanged during the next following switching operation interval $\tau$ in which the switches S*l* and S*r* are closed again, a storage capacitance transferring the exchanged signal energy during the entire next following switching pause to the respectively associated subscribed line. This results in a nearly attenuation-free two-wire connection between the two subscriber lines L*l* and L*r*. The switches are always loaded with a relatively high switching power which is proportional to the signal energy of a scanning period T and inversely proportional to the switching duration $\tau$, since the total signal energy obtained from a subscriber line during a scanning period T and stored by the corresponding storage capacitance, must be handled by the switches during the very short switching time $\tau$. Since $\tau<<T$, the low pass filter TP*l* with storage capacitance and the flyback inductance effect, in the time multiplex transmission system shown in FIG. 1*a*, a considerable increase of the power level of the signals delivered by the subscriber line L*l*, while the low pass filter TP*r* reduces the power level for these signals; likewise, the low pass filter TP*r* with storage capacitance and the flyback conductance, effect a considerable increase of the power level of the signals delivered by the subscribed line L*r*, while the power level for these signals in reduced again by the action of the low pass filter TP*l*.

Figure 1B:
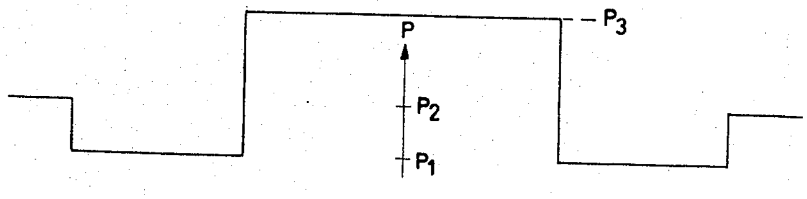

This change of the power level is schematically indicated in FIG. 1*b*. It will be seen from this figure that there is, as seen from the side facing away from the respective switches S*l* and S*r*, always a relatively low signal power power level $P_1$ ahead of the respective low pass filters TP*l* and TP*r*, while there obtains, between the two low pass filters, that is, over the switches S*l* and S*r* and the time multiplex connection bar ZMS, a relatively high signal power level $P_3$.

The switching power $N_s$, which a switch can transmit, is however limited, that is, the signal level $P_3$ must not exceed a predetermined value. The switch therefore can transmit only a signal power $N_u$ which is proportional to the switching duration $\tau$ and the switching power $N_{szul}$, which is permissible as a maximum, and inversely proportional to the duration of the scanning period T:

$$N_{uzul}<1/F\cdot\tau/T\cdot N_{szul}$$

wherein F is a form factor which considers the particular shape of the currents and voltages occurring in switches connected together with a storage capacitance and a flyback inductance. Assuming a maximum permissible switching power $N_{szul}$ of 1 w. and a switching duration $\tau$ of 0.5 microsecond, a switch constructed with the aid of modern electronic components can handle at a scanning period duration T of 100 microseconds, a signal power $N_u$ of about 1 mw.

When it is desired to increase the number of switching phases in each scanning period, for the purpose of increasing the number of transmission channels which are bundled as to time, it will be necessary to shorten the switching time $\tau$ during which two subscriber lines such as L*l* and L*r* are connected over the switches S*l* and S*r* and the time multiplex connection bar ZMS (it may be noted at this point that an increase of the duration of the scanning period T cannot be effected because it would result in a narrowing of the frequency band of the transmission channels). The permissible signal power $N_u$ is thereby reduced, such reduction being greater since the signal power is as a matter of course shorter in the case of an electronic switch with shorter switching duration $\tau$. Assuming a switching duration of 0.2 microsecond, it should be possible to obtain for the permissible switching power a maximum value of 0.1 w., so that such a time multiplex transmission system would permit a signal power amounting to only 30 $\mu$W. ($P_{N_u}=-1.7N$ at 600 ohms). There is accordingly a limit to the increase of the number of switching phases, since the signal power level on the mutually interconnected subscribed lines must not become as low as may be desired.

However, upon disposing, according to the invention, between the line section with limited loading which contains the switches S*l* and S*r*, and the respective subscriber lines L*l* and L*r*, a four-pole, as indicated respectively at VP*l* and VP*r*, for transmitting the signals delivered from the two line sections to the respective other line section, which four-pole acts in amplifying sense in the direction from the periodically operated switches S*l* and S*r* to the respective subscribed lines, while acting in power attenuating or damping sense in opposite direction, it will be possible to hold the power level in the subscriber lines L*l* and L*r* sufficiently high despite the relatively low loading of the electronic switches S*l* and S*r*.

The effect of such a four-pole is apparent from FIG. 1*b*. The signals delivered from the subscriber line L*l* which appear on such line with a power level $P_2$ are attenuated by the four-pole VP*l* by the amount $P_2-P_1$ and therefore appear at the low pass filter TP*l* only with the level $P_1$. While the storage capacitance of the low pass filter cooperating with the flyback inductance acts, upon subsequent transmission of the stored signal energy during the switching duration $\tau$, to raise the signal level by the amount $P_3-P_1$, the load on the line section containing the switches S*l* and S*r* is now lower by the factor $e^{-2(p2-p1)}$, than it would be in the absence of the four-pole, since the indicated raising of the level does not proceed from the signal level $P_2$ but from the lower signal level $P_1$. The signal level is again reduced to the level $P_1$, by the action of the storage capacitance of the low pass filter TP*r*, on the right side of the time multiplex transmission system shown in FIG. 1*a*. However, the successively positioned four-pole VP*r*, which is now actuated in a direction opposite to the transmission direction of the four-pole VP*l*, again amplifies the signals transmitted from the subscriber line L*l* to the subscriber line L*r*, so that the signal power level on the line L reaches the required level. In case it is desired that the pass-through attenuation in the entire transmission system should correspond to that of a transmission system without such four-poles VP*l* and VP*r*, the amount of power amplification of the four-poles VP*r* for the signals transmitted from the subscriber line L*l* to the subscriber line L*r*, must be equal to the amount of power attenuation effected for these signals by the four-pole VP*l*; however, it will be generally desirable to operate with a given excess of amplification because it will then be possible to reduce and in given cases to totally eliminate the pass-through attenuation of the entire system. What has been said above concerning the signals transmitted from L*l* to L*r* applies analogously to the signals transmitted in opposite direction from L*r* to L*l*, that is, the four-pole VP*r* must act in power attenuating sense and the four-pole VP*l* in power amplifying sense.

Figure 2:
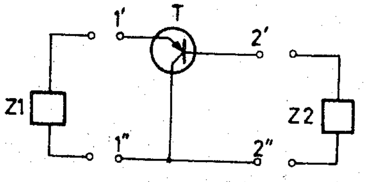
FIGS. 2 and 3 represent examples of four-poles.
Figure 3:
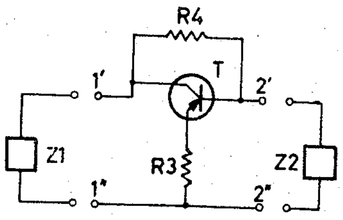

The foregoing explanations with reference to an example of a time multiplex transmission system, described the operation effected by a four-pole disposed between line sections which are differently loaded, for the two-wire transmission of signals delivered to its two pairs of terminals, to the other terminal pair, such four-pole acting in power amplifying sense in the direction from the line section with low loading to the line section with higher loading, while acting in power attenuating sense in the direction from the line section with higher loading to the line section with lower loading. In accordance with another feature of the invention, such a four-pole can be constructed with the aid of a transistor forming a T-member with the base electrode thereof connected with the line section with lower loading while the emitter-collector circuit is connected with the line section of higher loading, the base electrode thus representing the input for the signals which are to be transmitted amplified and also the output for the signals which are to be transmitted attenuated, and the emitter-collector circuit forming the input for the signals which are to be transmitted attenuated and at the same time the output for the signals which are transmitted amplified. FIGS. 2 and 3 show two embodiments of such a four-pole.

In the arrangement according to FIG. 2, the transistor T is operated in common collector circuit. The base electrode is connected with dipole Z2 which corresponds to the line section requiring low loading and the emitter-collector circuit is connected with a dipole Z1 which corresponds to the line section requiring higher loading. Assuming that the internal resistances of the two dipoles Z1 and Z2 are the same, the four-pole shown in FIG. 2 will amplify the signal power given off by the dipole Z2 and accepted by the dipole Z1, by the factor $e^{2.1n\beta}$, that is, the power level of the signals will be raised by the amount $1n\beta$, while the signal power in the opposite direction, of signals given off from the dipole Z1, to be accepted by the dipole Z2, will be attenuated by the factor $e^{2.1n\beta}$, that is, the signal level of these signals will be reduced by the amount $1n\beta$, the symbol $\beta$ representing the current amplification factor of the transistor. This simple circuit arrangement according to FIG. 2 already permits in principle a two-wire transmission of signals, whereby the power level of the signals transmitted in one direction is raised while the power level of the signals transmitted in opposite direction is lowered.

In the circuit arrangement shown in FIG. 3, the transistor T is operated in common emitter circuit, there being disposed in the transverse branch of the T-member a resistor R3 which effects a current feedback, and a resistor R4 which bridges the T-member longitudinally to effect a voltage feedback. Assuming sufficiently strong feedback, the degree of amplification of the signals transmitted in one direction and the degree of attenuation of the signals transmitted in the other direction, are in this arrangement largely independent of the current amplification factor $\beta$ of the transistor T and therewith independent of the transistor properties. The attenuation and the amplification are determined practically solely by the feedback, that is, by the resistors R3 and R4.

In the event that the losses with a circuit arrangement according to FIG. 3, for example, in a transmission system according to FIG. 1*a*, would be too high for practical operation, resulting in prohibitively high pass-through attenuation for the entire system, there may be inserted in the transverse branch of the T-member shown in FIG. 3, a winding of a repeater coupled in an aiding sense, with the primary winding of the repeater connected to the collector of the transistor T. Two four-poles constructed in this manner are provided in the time multiplex transmission system shown in FIG. 4.

As in the time multiplex transmission system represented in FIG. 1*a*, there are again provided two four-poles having in this case transistors T*l* and T*r*, which are disposed between subscriber lines L*l* and L*r* and a low pass filter arranged ahead of periodically actuated switches S*l* and S*r*, respectively. The two subscriber lines L*l* and L*r* are terminated by secondary windings II of repeaters respectively indicated by Ü*l* and Ü*r*, the primary winding I of the respective repeater being connected with the collector of the corresponding transistor T*l* and T*r*. Each of the terminal repeaters Ü*l* and Ü*r* has a tertiary winding III which is coupled in an aiding sense in the transverse branch of the T-member formed respectively by the transistors T*l* and T*r*. The use of this winding III makes it possible to obtain in the time multiplex transmission system shown in FIG. 4, a condition in which the pass-through attenuation just disappears.

Figure 4:
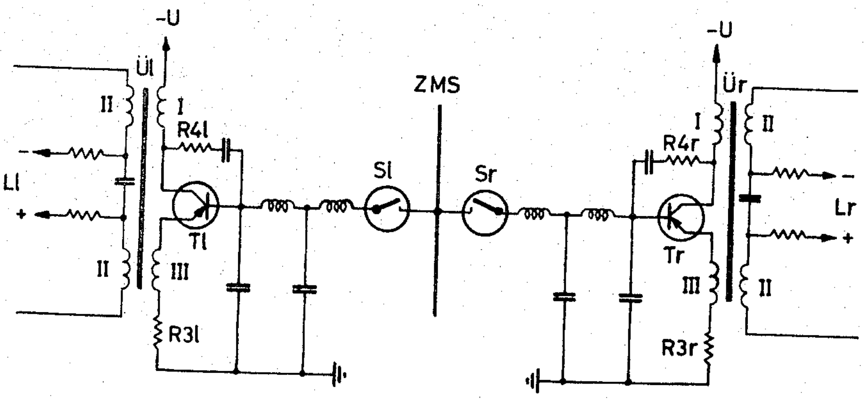
FIG. 4 shows an example of a two-wire transmission system.

The insertion, according to the invention, of the two four-poles with the transistors T*l* and T*r*, as in FIG. 4, makes it possible to reduce a signal level of 1 mw., at 600 ohms (0 Np), upon a subscriber line, for example, the line L*l*, prior to reaching the switch S*l*, to a value of about 7 $\mu$w., so that the switching power which is to be transmitted does not exceed the value 25 mw. even with a switching duration of 0.2 $\mu$sec. at a scanning period duration T of 100 $\mu$sec. Electronic switches with a permissible switching power can at the present state of development be readly realized. The insertion, according to the invention, between a subscriber line and the periodically operating call switch assigned thereto, of a four-pole which acts in power amplifying sense in the direction from the call switch to the corresponding subscriber line while acting in power attenuating sense in the direction from the subscriber line to the call switch, not only achieves for the first time a reduction of the loading of the periodically operated switch with uniformly high signal power level on the respectively interconnected subscriber lines, but also makes it possible to obtain an increase in the number of the scanning phases in a scanning period, and therewith an increase in the number of transmission channels of the time multiplex system, which channels are bundled as to time.

The insertion, according to the invention, between two line sections of a two-wire transmission system, of a four-pole which acts in one direction in power amplifying sense while acting in the other direction in power attenuating sense, is not inherently limited for use in connection with a time multiplex transmission system, as described herein, but may be generally effected in connection with transmission systems in which different power levels are required or desired, whereby the four-pole may be in accordance with a further feature of the invention, constructed in a manner similar to a two-wire amplifier having an amplifier in the branch which transmits in one direction while having an attenuating member in the branch which transmits in the other direction.

Changes may be made within the scope and spirit of the appended claims which define what is believed to be new and desired to have protected by Letters Patent.

I claim:

1. A two-wire operated communication transmission system having a plurality of two-wire operated line sections which are connectable with a time multiplex bar over periodically actuated switches and require different power levels, comprising a two-wire operated four-pole having a power transformation ratio greater than one in one direction, from its lower power level connection terminals to its higher power level connection terminals, and having a power transformation ratio smaller than one in the other direction, from its higher power level connection terminals to its lower power level connection terminals, disposed between two such line sections which require different power levels, for transmitting signals delivered from the respective one line section to the respective other line section, with said four-pole being disposed between the line section and the switch respectively assigned thereto in such a manner that its connection terminals of lower power level are connected to the switch and its connection terminals of higher power level are connected to said line section, thereby acting in power amplifying sense in the direction from the corresponding switch to the respective line section while acting in power attenuating sense in the direction from the corresponding line section to the respective switch, whereby it is operative in power amplifying sense in the direction from the line section which requires low power level to the line section requiring power level and acting in power attenuating sense in the direction from the line section requiring attenuating sense in the direction from the line section requiring higher power level to the line section requiring lower power level.

2. A transmission system according to claim 1, comprising a low pass filter disposed between the respective four-pole and the corresponding switch.

3. A transmission system according to claim 2, wherein the four-pole comprises a transistor forming a T-member, the base electrode of said transistor being connected with the line section requiring lower power level, a second electrode of said transistor being connected with the line section requiring higher power level, and a third electrode being connected both to said one and said other line section, whereby the base electrode and the said third electrode form the input for the signals which are to be transmitted with amplification and also the output for the signals which are to be transmitted with attenuation, the emitter-collector circuit forming the input for the signals which are to be attenuated and the output for the signals which are amplified.

4. A transmission system according to claim 3, wherein the transistor is connected in common collector circuit.

5. A transmission system according to claim 3, wherein said transistor is connected in common emitter circuit, and means connected to said transistor forming a feedback therefor.

6. A transmission system according to claim 5, comprising a resistor, disposed in the transverse branch of the T-member, for effecting a current feedback.

7. A transmission system according to claim 6, comprising a resistor bridging the longitudinal branch of said T-member, said resistor effecting a voltage feedback.

8. A transmission system according to claim 7, comprising a terminal repeater having a winding connected with the collector of the transistor, and having a tertiary winding connected in the transverse branch of said T-member.

References Cited

UNITED STATES PATENTS

| | | | |
|---|---|---|---|
| 2,517,960 | 8/1950 | Barney | 179—170 |
| 2,662,122 | 12/1953 | Ryder | 179—170 |
| 2,718,621 | 9/1955 | Haard et al. | 179—15 |
| 2,870,259 | 1/1959 | Norris | 179—15 |
| 3,071,651 | 1/1963 | Frankel | 179—15 |

KATHLEEN H. CLAFFY, *Primary Examiner.*

ROBERT H. ROSE, *Examiner.*

L. HOFFMAN, J. W. JOHNSON, H. ZELLER, *Assistant Examiners.*